March 15, 1966 R. FERGUSON ETAL 3,240,293
BRAKE MECHANISM INCORPORATING FLOATING BRAKE BAND AND MEANS
APPLYING THE SAME TO REVERSIBLY ROTATED BRAKE DRUM
Filed Jan. 3, 1964
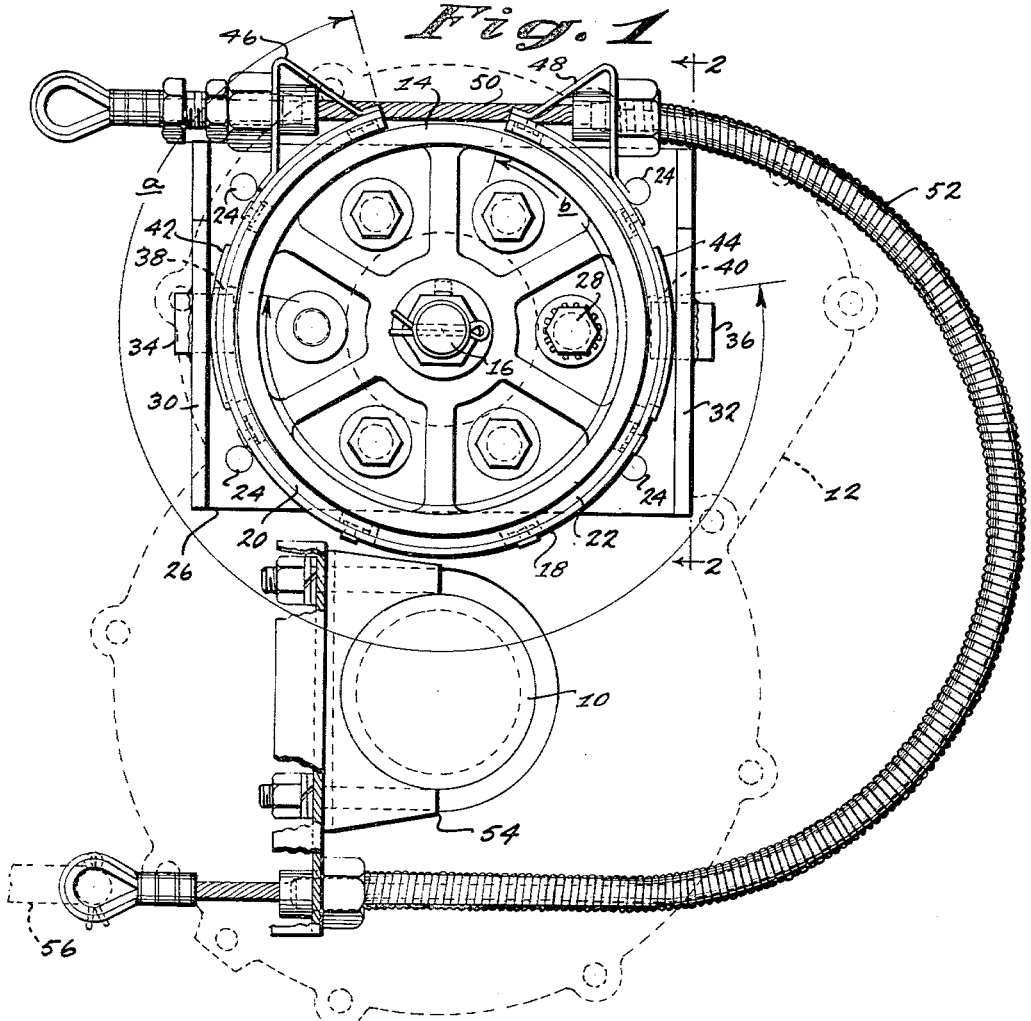
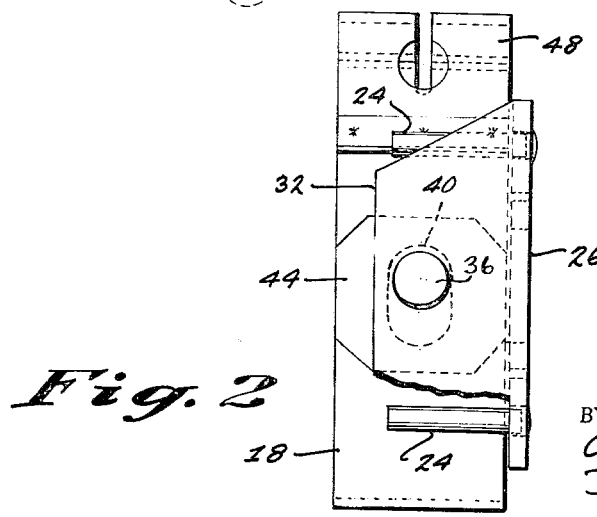
INVENTORS
RICHARD FERGUSON &
GETTYS D. HOYLE
BY
Channing L. Richards &
Dalbert U. Shefte
ATTORNEYS

United States Patent Office 3,240,293
Patented Mar. 15, 1966

3,240,293
BRAKE MECHANISM INCORPORATING FLOATING BRAKE BAND AND MEANS APPLYING THE SAME TO REVERSIBLY ROTATED BRAKE DRUM
Richard Ferguson and Gettys D. Hoyle, both of Charlotte, N.C., assignors to The Terrell Machine Company, Charlotte, N.C., a corporation of North Carolina
Filed Jan. 3, 1964, Ser. No. 335,599
4 Claims. (Cl. 188—77)

This invention relates to brake mechanisms of the type that apply an external brake band to a brake drum in a self-energizing manner and that operate with equal effectiveness to brake rotation of the brake drum in either direction.

The brake mechanism of this sort that is provided by the present invention incorporates an exceptionally simple actuating arrangement and is additionally characterized by uniquely related means for applying a braking action that is nicely balanced between self-energization and de-energization of the braking system, so that the braking actuation maintains a good "feel," responds readily to a reasonably small actuating force, and is not unduly sensitive to moisture or subject to the objectionable "grabbing" that moisture can cause in braking action.

These features are obtained in the brake mechanism of the present invention by arranging the brake band in floating relation for braking contraction around the brake drum and providing for a selected self-energizing length of brake band, as described at length below in connection with the accompanying drawings, in which:

FIG. 1 is a side elevation illustrating a representative operating arrangement for a brake mechanism embodying the present invention; and FIG. 2 is a supplementary right end detail substantially as seen from the 2—2 position in FIG. 1.

The embodiment of the invention that is illustrated in the drawings represents a braking arrangement that is especially well suited for use in battery-powered golf carts; the housing for the driven axle of the golf cart being indicated in FIG. 1 at 10, and the housing for the transmission drive thereto being shown in dotted lines at 12.

The brake mechanism is arranged in relation to a brake drum 14 mounted axially at 16 to follow the rotating motion of an element of the gear train (not shown) that forms the transmission drive contained within the housing 12; an extended shaft portion of the followed element reaching through the housing 12 to carry the brake drum 14 axially at 16.

About the brake drum 14, a substantially encircling, external brake band 18 is arranged in circularly floating relation for contraction thereon to apply lining segments 20 and 22 for braking action; the idle expanded disposition of this external brake band 18 being maintained free of the brake drum 10 by spacing pins 24 arranged for this purpose on a bracket structure 26 (compare FIGS. 1 and 2) that is secured at the outer face of the transmission housing 12 (by the FIG. 1 studs 28) with opposed flange portions 30 and 32 thereof standing symmetrically at each side of the brake drum 14 and the encircling brake band 18 thereon.

The opposed flange portions 30 and 32 of the bracket structure 26 are provided to carry respective anchor lugs 34 and 36 that are arranged thereon to project radially inward to a lost motion situation within elongated, circumferential slots 38 and 40 formed in the external brake band 18 (and cleared in the lining segments 20 and 22) to define limits confining the extent to which the circularly floating brake band 18 may shift in either circular direction (i.e., clockwise or counterclockwise), and, additionally, to serve with the anchor lugs 34 and 36 as a selective reaction system through which a nice modulation of the braking action is made possible, while maintaining the braking action equally effective in either direction, as will be noted further presently. Preferably, outer thickening plates 42 and 44 are added to the brake band 18 to reinforce it at these slots 38 and 40 for interaction with the anchor lugs 34 and 36.

In order to provide for braking contraction of the external brake band 18 on the brake drum 14, each end of brake band 18 is fitted with an assembly bracket, as at 46 and 48, for respective attachment of a tension strand 50 and a tubular sheath 52 through which the tension strand 50 shiftably extends. The tubular sheath 52 is advantageously of the flexible type that tolerates lateral bending but is essentially rigid lengthwise, so that its operating disposition may be arranged readily in relation to the surrounding structural circumstances of its use (as in FIG. 1), while allowing it still to exert a brake contracting reaction to brake actuating tension applied through the strand 50 which it houses, and which should be a similarly flexible wire cable or the like.

The tubular sheath 52 is installed to provide the above-noted contracting reaction by securing its remote end (i.e., the end opposite the one attached to the brake band bracket 48) at a clamp bracket 54, fixed on the previously mentioned driven axle housing 10. As one end of the tension strand 50 extends from the brake band attached end of the sheath 52 to an attachment at the opposite brake band bracket 46, a contraction of the brake band 18 necessarily results whenever the tension strand 50 is pulled (through a pedal rod connection 56 or the like) at the other end thereof that extends beyond the held end of sheath 52 at clamp bracket 54, because the essentially rigid lengthwise character of the sheath 52 reacts from the clamp bracket 54 to cause any pulled shifting of the tension strand therein to be exerted in drawing together the adjacent ends of the brake band 18 and thereby contracting it on the brake drum 14 against the normal tendency of the band 18 to stay at an expanded free position.

Upon any contraction of brake band 18 through application of a braking actuation pull on the tension strand 50, the first result will be an initial tightening of the lining segments 20 and 22 on the brake drum 14 with a consequent tendency toward circular shifting of the floating brake band assembly in the direction in which the brake drum 14 happens to be rotating when the braking action is applied. Assuming, for present purposes, that the direction of rotation is clockwise (as seen in FIG. 1), a clockwise circular shifting of the brake band assembly will take place until the anchor lug 36 engages the opposing end of brake band slot 40 to preclude any further circularly shifting. When this happens, the arresting engagement of anchor lug 36 at the end of slot 40 induces a self-energizing capstan effect on the brake band 18 through the arc $a$ (see FIG. 1) that reaches from the active opposing end of slot 40 to the end of band 18 that extends in the direction of brake band rotation. Conversely, if the brake drum rotation is counterclockwise, the anchor lug 34 becomes the effective one, and the self-energizing capstan effect is induced through the arc $b$ reaching from the active end of the brake band slot 38 thereat.

The self-energizing action of external brake bands has previously been recognized and employed in brake mechanisms of the general type involved here, but the arrangement provided by the present invention for taking advantage of this action is unique both as to the simplicity with which the braking is actuated and as to the modulated or selected degree of braking that this arrangement makes possible. By employing an external brake band with a substantially full circle wrap in a self-energizing manner, the braking action is not only made essentially torsional in character so as to relieve the brake drum of radial load, and it not only becomes possible to apply the braking action with equal effectiveness to either direction of brake drum rotation, but the actuating force needed for braking action can also be substantially reduced and, to a relative extent, the brake drum can be made smaller by reason of the self-energizing nature of the braking action. However, an entirely proper relative proportioning of brake drum size to actuating force is not readily provided because over-reduction of brake drum size works against minimizing the actuating force, so that if the necessary actuating force is to be maintained reasonably small, the brake drum size will usually need to be larger than is necessary to provide the required braking action, and the result is to render the brake mechanism subject to "grabbing" objectionably particularly if it must be used under conditions that expose it to moisture.

The present invention obviates this difficulty by separately arranging the spaced anchor lugs 34 and 36 so that the self-energizing action of the brake band 18 can be balanced or proportioned nicely without disturbing the selected actuating force level that is considered desirable. By providing such separately spaced anchor lugs 34 and 36, the segment of the brake band 18 that extends from the effective lug 34 or 36 oppositely with respect to the direction of brake drum rotation becomes de-energizing, so as to exert a substantially negligible braking effect and allow the braking to be done through the self-energizing arc $a$ or $b$. The result is an easily actuated brake mechanism that operates smoothly and effectively with a good "feel," and in which the flexible tension strand and sheath arrangement provided for actuation serves additionally to eliminate any "kickback" at the point of actuation from the initial circular shifting of the floating brake band assembly upon actuation.

For the illustrated golf cart use, a brake drum diameter of about 4⅜ inches with anchor lugs 34 and 36 spaced to provide self-energizing arcs $a$ and $b$ of about 270° has been found to balance the braking action exceptionally well. For other applications, this relative proportioning may be changed to suit the requirements of particular circumstances.

The present invention has been described in detail above for purposes of illustration only and is not intended to be limited by this description or otherwise except as defined in the appended claims.

We claim:

1. A brake mechanism comprising a brake drum mounted axially to follow the rotating motion of a reversibly rotated operating element that requires braking, an external brake band lined for frictional braking action and substantially encircling said brake drum in circularly floating relation for braking contraction thereon, means floating with said brake band for causing said braking contraction by pulling the ends thereof together through the application of a tension force having a direction essentially tangent to the encircling disposition of the brake band, and a pair of fixed abutment elements extending for alternative lost motion engagement with said brake band upon said braking contraction to limit circular floating thereof and to react alternatively in opposition to the force system urging said circular floating as determined by the direction of rotation of said brake drum, the abutment elements of said pair being formed by lug members fixed respectively to extend radially towards said brake drum for said engagement therewith at a spacing less than the full encircling length of the brake band from the end thereof that extends in the direction of brake drum rotation, and said brake drum being slotted in the direction of its circumference at correspondingly paired locations to receive said extending lug members in lost motion relation for selective engagement with the lug member of said pair that is made effective by the direction of brake drum rotation.

2. A brake mechanism as defined in claim 1 and further characterized in that said means floating with said brake band for causing said braking contraction comprises a flexible tubular sheath of the type that tolerates lateral bending while remaining essentially rigid lengthwise, and a flexible tension strand disposed in and reaching shiftably through said sheath to extend from both ends thereof, one end of the sheath being attached at one end of the brake band and the other end thereof being held to cause contracting reaction through said sheath at said brake band end, and the end of the tension strand extending from the attached end of said sheath being secured to the other end of said brake band with the other strand end extending from the held end of said sheath for the application of tension to said strand thereat to contract said brake band against the reaction of said sheath.

3. A brake mechanism as defined in claim 2 and further characterized in that said reversibly rotated operating element is driven by a gear train and said brake drum is mounted to rotate with an element of said gear train.

4. A brake mechanism as defined in claim 3 and further characterized in that said reversibly rotated operating element is the driven axle of a golf cart, in that said gear train is the transmission drive for said golf cart axle and is disposed above said axle, in that said axle and transmission drive are respectively housed, in that the held end of said flexible sheath is secured by bracket means on said axle housing, in that said brake drum is mounted exteriorly of said transmission drive housing on an extended portion of an element of said transmission drive, and in that said pair of abutment elements are fixed on bracket means carried exteriorly by said transmission drive housing.

References Cited by the Examiner

UNITED STATES PATENTS

| 731,646 | 6/1903 | Wilson et al. | |
|---|---|---|---|
| 1,673,211 | 6/1928 | Staude | 188—77 |
| 2,400,359 | 5/1946 | Lear | 188—77 |
| 2,633,938 | 4/1953 | Rodger | 188—77 |

FOREIGN PATENTS 21,380   11/1900   Great Britain.

FERGUS S. MIDDLETON, *Primary Examiner.*

RALPH D. BLAKESLEE, ARTHUR L. LA POINT,
*Examiners.*